(12) United States Patent
Bian et al.

(10) Patent No.: US 11,092,872 B1
(45) Date of Patent: Aug. 17, 2021

(54) INTER-CHIP AND INTRA-CHIP COMMUNICATIONS

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/819,971

(22) Filed: Mar. 16, 2020

(51) Int. Cl.
*G02F 1/29* (2006.01)
*G02B 6/12* (2006.01)
*G02B 6/122* (2006.01)

(52) U.S. Cl.
CPC ........... *G02F 1/292* (2013.01); *G02B 6/1225* (2013.01); *G02B 2006/1213* (2013.01)

(58) Field of Classification Search
None
See application file for complete search history.

(56) References Cited

U.S. PATENT DOCUMENTS

| | | | |
|---|---|---|---|
| 6,821,457 B1 | 11/2004 | Natarajan et al. | |
| 6,891,987 B2* | 5/2005 | Ionov | G02F 1/292 |
| | | | 342/368 |
| 8,311,374 B2 | 11/2012 | Hochberg et al. | |
| 9,124,373 B2* | 9/2015 | Aflatouni | H04B 10/50577 |
| 10,613,410 B2* | 4/2020 | Hosseini | G02F 1/292 |
| 10,634,973 B2* | 4/2020 | Hashemi | G02B 5/008 |
| 10,866,487 B1* | 12/2020 | Keller | G02F 1/292 |
| 2017/0324162 A1* | 11/2017 | Khachaturian | H01Q 21/065 |
| 2017/0371227 A1 | 12/2017 | Skirlo et al. | |
| 2018/0039154 A1* | 2/2018 | Hashemi | G02B 6/1226 |
| 2018/0107091 A1* | 4/2018 | Hosseini | G02F 1/2955 |
| 2019/0056634 A1* | 2/2019 | Hosseini | G02F 1/292 |
| 2020/0259256 A1* | 8/2020 | Yu | G01S 7/4811 |

OTHER PUBLICATIONS

Jacob et al., "Three Dimensional Optical Interconnects" filed Mar. 11, 2019 as U.S. Appl. No. 16/298,354.
M. S. Parekh, P. A. Thadesar and M. S. Bakir, "Electrical, optical and fluidic through-silicon vias for silicon interposer applications," 2011 IEEE 61st Electronic Components and Technology Conference (ECTC), Lake Buena Vista, FL, 2011, pp. 1992-1998.

(Continued)

*Primary Examiner* — Rhonda S Peace
(74) *Attorney, Agent, or Firm* — Thompson Hine LLP

(57) ABSTRACT

Structures including an optical phased array and methods of fabricating such structures. A first optical phased array includes a first plurality of antennas. A plurality of phase shifters are respectively coupled to the first plurality of antennas. A second optical phased array includes a second plurality of antennas, and a third optical phased array includes a third plurality of antennas. The second optical phased array is located in a first direction relative to the first optical phased array. The third optical phased array is located in a second direction relative to the first optical phased array. The second direction is different from the first direction.

20 Claims, 5 Drawing Sheets

(56) References Cited

OTHER PUBLICATIONS

A. Louri and Hongki Sung, "3D optical interconnects for high-speed interchip and interboard communications," in Computer, vol. 27, No. 10, pp. 27-37, Oct. 1994.
Thijs Spuesens, Fabien Mandorlo, Pedro Rojo-Romeo, Philippe Régreny, Nicolas Olivier, Jean-Marc Fédeli, and Dries Van Thourhout, "Compact Integration of Optical Sources and Detectors on SOI for Optical Interconnects Fabricated in a 200 mm CMOS Pilot Line," J. Lightwave Technol. 30, 1764-1770 (2012).
R. T. Chen et al., "Fully embedded board-level guided-wave optoelectronic interconnects," in Proceedings of the IEEE, vol. 88, No. 6, pp. 780-793, Jun. 2000.
Siyuan Yu, "Potentials and challenges of using orbital angular momentum communications in optical interconnects," Opt. Express 23, 3075-3087 (2015).
Favi et al, "Techniques for Fully Integrated Intra-/Inter-chip Optical Communication", Proceedings of the 45th annual Design Automation Conference, Jun. 2008.
Ke Wang, Ampalavanapillai Nirmalathas, Christina Lim, Efstratios Skafidas, and Kamal Alameh, "High-speed free-space based reconfigurable card-to-card optical interconnects with broadcast capability," Opt. Express 21, 15395-15400 (2013).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.
Dongwei Zhuang, Lanxuan Zhagn, Xiaochuan Han, Yuxuan Li, Yingzhi Li, Xiaobin Liu, Fengli Gao, and Junfeng Song, "Omni-directional beam steering using aperiodic optical phased array with high error margin," Opt. Express 26, 19154-19170 (2018).

\* cited by examiner

US 11,092,872 B1

INTER-CHIP AND INTRA-CHIP COMMUNICATIONS

BACKGROUND

The present invention relates to photonics chips and, more particularly, to structures including an optical phased array and methods of fabricating such structures.

Photonics chips are used in many applications and systems, such as data communication systems and data computation systems. A photonics chip integrates optical components, such as waveguides, optical switches, and polarizers, and electronic components, such as field-effect transistors, into a unified platform. Among other factors, layout area, cost, and operational overhead may be reduced by the integration of both types of components.

Improved structures including an optical phased array and methods of fabricating such structures are needed.

SUMMARY

In an embodiment of the invention, a structure includes a first optical phased array including a first plurality of antennas, a second optical phased array including a second plurality of antennas, and a third optical phased array including a third plurality of antennas. A plurality of phase shifters are respectively coupled to the first plurality of antennas. The second optical phased array is located in a first direction relative to the first optical phased array. The third optical phased array is located in a second direction relative to the first optical phased array. The second direction is different from the first direction.

In an embodiment of the invention, a method includes forming a first optical phased array including a first plurality of antennas, forming a first plurality of phase shifters, forming a second optical phased array including a second plurality of antennas, and forming a third optical phased array including a third plurality of antennas. The second optical phased array is located in a first direction relative to the first optical phased array, and the third optical phased array is located in a second direction relative to the first optical phased array. The second direction is different from the first direction.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
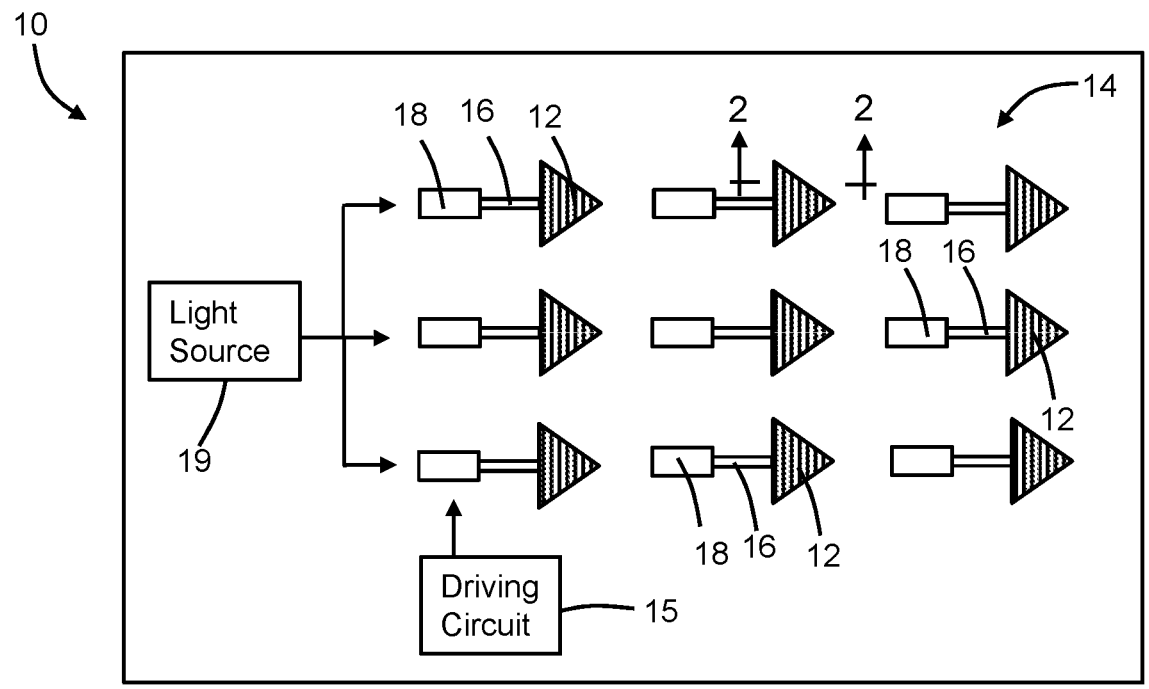
FIG. 1 is a top view of a photonic chip in accordance with embodiments of the invention.
Figure 2:
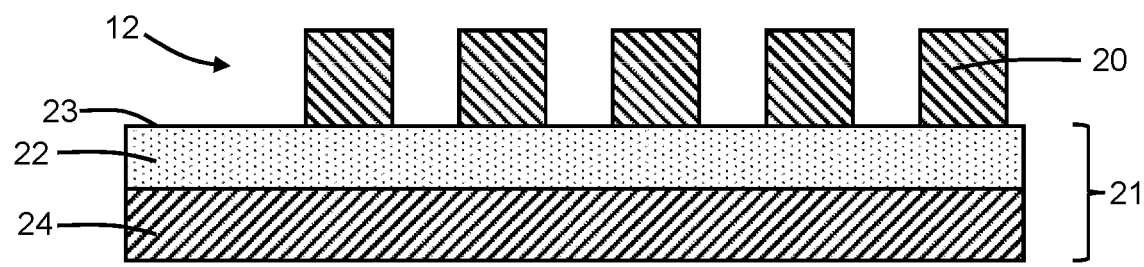
FIG. 2 is a cross-sectional view taken generally along line 2-2 in FIG. 1.

With reference to FIGS. 1, 2 and in accordance with embodiments of the invention, a photonics chip 10 includes multiple optical antennas 12 that are arranged as an optical phased array 14. The optical antennas 12 may be positioned in the rows and columns of a matrix or grid to define the optical phased array 14. Each optical antenna 12 of the optical phased array 14 may be coupled by one or more waveguides 16 with an optical phase shifter 18. The optical phased array 14, waveguides 16, and optical phase shifters 18 may be located on a substrate 21 of the photonics chip 10. The optical phase shifters 18 may be, for example, p-n junction phase shifters or thermal phase shifters that are formed by conventional fabrication processes. A driving circuit 15 may be coupled with the optical phase shifters 18, as indicated diagrammatically by the single-headed arrow. A light source 19, such as a laser, may supply output light that is split into multiple branches and fed by waveguides to the optical phase shifters 18, as indicated diagrammatically by the single-headed arrows.

Each optical antenna 12 includes a set of grating structures 20 that may be arranged with a given pitch and duty cycle. In an embodiment, the grating structures 20 may be composed of a single-crystal semiconductor material, such as single-crystal silicon. The grating structures 20 of each optical antenna 12 may be patterned from a layer of the single-crystal semiconductor material by lithography and etching processes. In an embodiment, the substrate 21 may be a silicon-on-insulator (SOI) substrate, and the grating structures 20 of each optical antenna 12 may be composed of single-crystal silicon originating from a device layer of the silicon-on-insulator substrate. The silicon-on-insulator substrate may further include a buried insulator layer 22 composed of a dielectric material, such as silicon dioxide, and a semiconductor substrate 24 composed of a single-crystal semiconductor material, such as single-crystal silicon, beneath the buried insulator layer. Alternatively, the grating structures 20 may be composed of a different type of material, such as silicon nitride, that is deposited and patterned by lithography and etching processes.

The optical phased array 14 may be a transceiver that is configured to transmit a beam of light to an off-chip receiver and to receive a beam of light from an off-chip transmitter. The optical phased array 14 may be tuned using the driving circuit 15 and optical phase shifters 18 to steer an emitted beam of light in order to travel in different directions or to adjust a view direction in order to receive a beam of light. The tuning may be accomplished without moving the optical antennas 12 and, as such, the antennas 12 and optical phased array 14 may lack moving mechanical parts, such as steering mirrors and/or MEMS elements.

Figure 3:
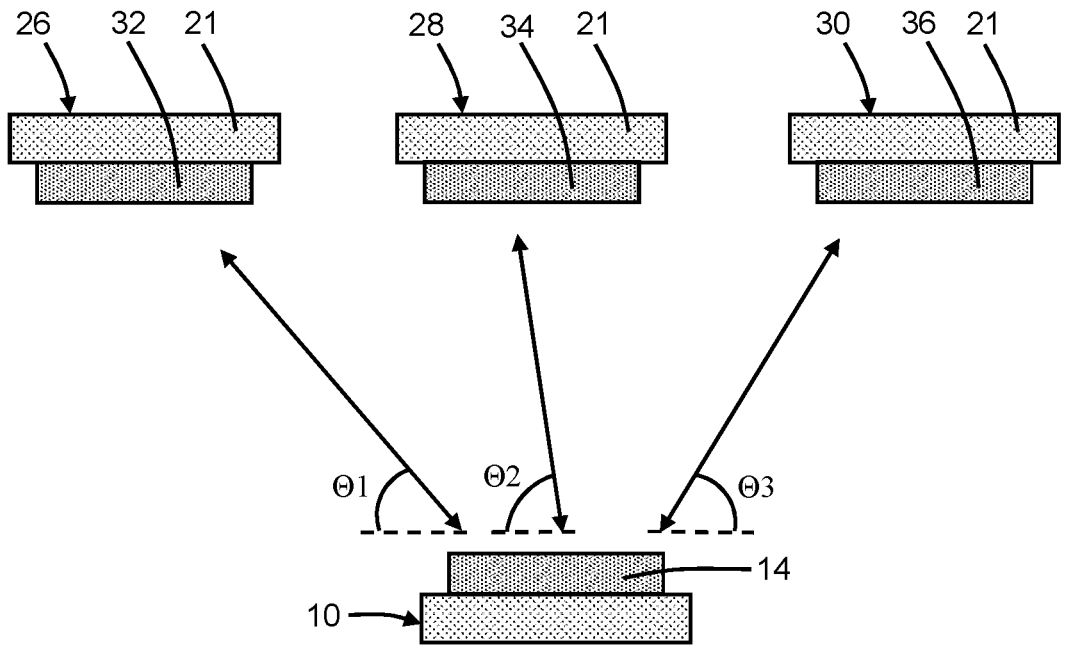
FIGS. 3-8 are diagrammatic side views of structures with photonics chips in accordance with embodiments of the invention.

With reference to FIG. 3 and in accordance with embodiments of the invention, the photonics chip 10 may be positioned relative to other photonics chips 26, 28, 30. The photonics chip 26 is provided with an optical phased array 32 similar or identical to the optical phased array 14. In an embodiment, the photonics chip 26 may further include optical phase shifters, each similar to the optical phase shifter 18, coupled with the optical antennas of the optical phased array 32. The photonics chip 28 is provided with an optical phased array 34 similar or identical to the optical phased array 14. In an embodiment, the photonics chip 28 may further include optical phase shifters, each similar to the optical phase shifter 18, coupled with the optical antennas of the optical phased array 34. The photonics chip 30 is provided with an optical phased array 36 similar or identical to the optical phased array 14. In an embodiment, the photonics chip 30 may further include optical phase shifters, each similar to the optical phase shifter 18, coupled with the optical antennas of the optical phased array 36. In an alternative embodiment, the photonics chips 26, 28, 30 may omit the optical phase shifters.

The photonics chip 10 may be spaced from the other photonics chips 26, 28, 30 by free space (i.e., air). In an alternative embodiment, the photonics chip 10 and photonics chips 26, 28, 30 may be held in desired positions by any suitable fill material that is optically transparent or translucent to the transmitted and received light. The fill material may be a low-index material so as not to interfere with the communication between the chips The photonics chip 10 may be located with spatial separations and placements relative to the photonics chips 26, 28, 30 such that the photonics chip 10 can independently communicate with each of the photonics chips 26, 28, 30. The photonics chips 26, 28, 30 may be positioned and/or oriented such that their respective optical phased arrays 32, 34, 36 have fields of view or lines of sight for communicating with the optical phased array 14 of the photonics chip 10. The lines of sight may be unobstructed for efficient communication. For example, the photonics chips 26, 28, 30 may be flipped (i.e., inverted) relative to the photonics chip 10.

The photonics chip 10 may provide a central control chip for which its optical phased array 14 is configured to communicate with the respective optical phased arrays 32, 34, 36 of the other photonics chips 26, 28, 30 in an inter-chip communications system. The photonics chip 10 may also relay communications between the different photonics chips 26, 28, 30. In addition to the optical phased array 14, the photonics chip 10 may include additional photonic and electronic circuitry in the driving circuit 15 that permits the photonics chip 10 to operate as a central control chip for the other photonics chips 26, 28, 30. The driving circuit 15 is capable of adjusting the optical phase shifters 18 to provide the different angles of emission or different view directions of the optical phased array 14.

The photonics chip 10 may be configured to communicate with each of the photonics chips 26, 28, 30 by adjusting the optical phase shifters 18 under the control of the driving circuit 15. The optical phased array 32 of the photonics chip 26 is located at an angle, $\theta 1$, relative to optical phased array 14 of the photonics chip 10. The optical phased array 14 of the photonics chip 10 may be tuned to communicate with the optical phased array 32 of the photonics chip 26 by directing a steered beam of light from the optical phased array 14 at an emission angle equal to the angle, $\theta 1$, or by aiming the optical phased array 14 in a view direction equal to the angle, $\theta 1$, to receive a beam of light from the photonics chip 26. The optical phased array 34 of the photonics chip 28 is located at an angle, $\theta 2$, relative to optical phased array 14 of the photonics chip 10. The optical phased array 14 of the photonics chip 10 may be tuned to communicate with the optical phased array 34 of the photonics chip 28 by directing a steered beam of light from the optical phased array 14 at an emission angle equal to the angle, $\theta 2$, or by aiming the optical phased array 14 in a view direction equal to the angle, $\theta 2$, to receive a beam of light from the photonics chip 28. The optical phased array 36 of the photonics chip 28 is located at an angle, $\theta 3$, relative to optical phased array 14 of the photonics chip 10. The optical phased array 14 of the photonics chip 10 may be tuned to communicate with the optical phased array 36 of the photonics chip 30 by directing a steered beam of light from the optical phased array 14 at an emission angle equal to the angle, $\theta 3$, or by aiming the optical phased array 14 in a view direction equal to the angle, $\theta 3$, to receive a beam of light from the photonics chip 26. The driving circuit 15 and optical phase shifters 18 may be used to control and match the emission angle and view direction of the optical phased array 14 enabling communication between the different chip pairs.

Although the emission angle of each individual optical antenna 12 of the optical phased array 14 is fixed and the grating structures 20 of each optical antenna 12 are stationary with fixed positions, the optical phase shifters 18 of the photonics chip 10 may be used to tune the phase delay and adjust the interference to thereby provide the reconfigurable emission angle of the optical phased array 14. Consequently, the emission angle of the optical phased array 14 is variable. The amplitude of the emitted beam of light from the optical phased array 14 is not controlled. In an embodiment, the optical phase shifters associated with the optical phased arrays 32, 34, 36 may also be used to enable inter-chip communications.

The angles $\theta 1$, $\theta 2$, $\theta 3$ may be measured relative to a reference plane defined by a top surface 23 of the substrate 21. Each of the angles $\theta 1$, $\theta 2$, $\theta 3$ may include an azimuthal component and an elevational component in a spherical coordinate system. In an embodiment, the azimuthal component of each of the angles $\theta 1$, $\theta 2$, $\theta 3$ may be equal and the elevational component may be varied by tuning. In an embodiment, each of the angles $\theta 1$, $\theta 2$, $\theta 3$ may include a range of angles.

Figure 4:
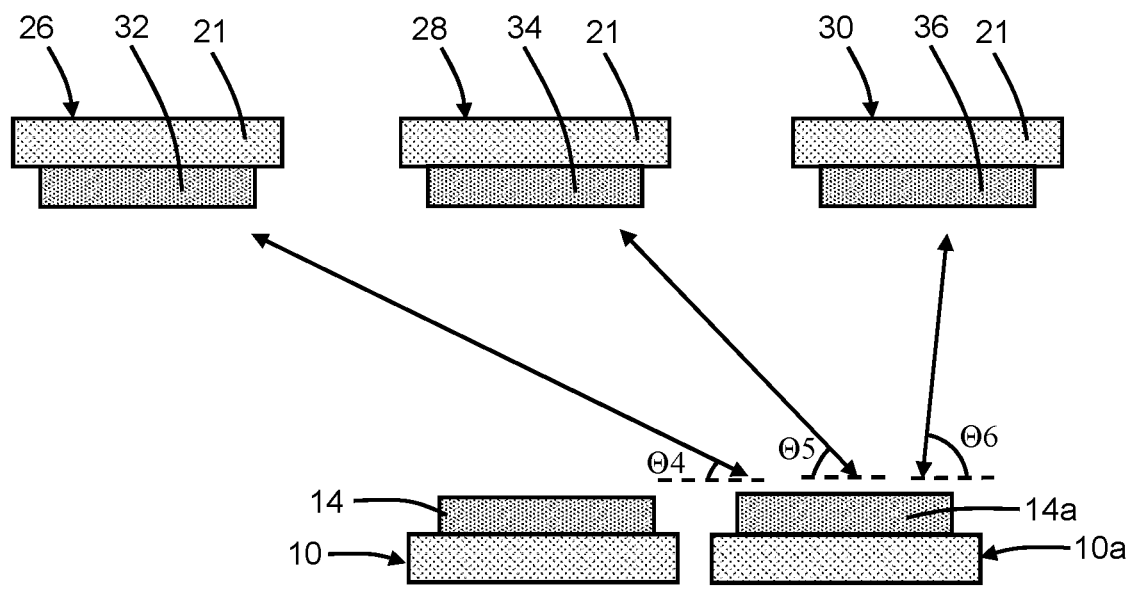

With reference to FIG. 4 and in accordance with embodiments of the invention, a chip 10a, which is similar to the photonics chip 10, may be positioned relative to the photonics chips 26, 28, 30. The photonics chip 10a is provided with an optical phased array 14a similar or identical to the optical phased array 14 of the photonics chip 10, as well as optical phase shifters each similar to the optical phase shifter 18 of the photonics chip 10, a driving circuit similar to the driving circuit 15 of the photonics chip 10, and a light source similar to light source 19 of the photonics chip 10.

The photonics chip 10a may be configured to communicate with each of the photonics chips 26, 28, 30 by adjusting the optical phase shifters 18 under the control of the driving circuit 15. The optical phased array 32 of the photonics chip 26 is located at an angle, $\theta 4$, relative to optical phased array 14a of the photonics chip 10a. The optical phased array 14a of the photonics chip 10a may be tuned to communicate with the optical phased array 32 of the photonics chip 26 by directing a steered beam of light from the optical phased array 14a at an emission angle equal to the angle, $\theta 4$, or by aiming the optical phased array 14a in a view direction equal to the angle, $\theta 4$, to receive a beam of light from the photonics chip 26. The optical phased array 34 of the photonics chip 28 is located at an angle, $\theta 5$, relative to optical phased array 14a of the photonics chip 10a. The optical phased array 14a of the photonics chip 10a may be tuned to communicate with the optical phased array 34 of the photonics chip 28 by directing a steered beam of light from the optical phased array 14a at an emission angle equal to the angle, $\theta 5$, or by aiming the optical phased array 14a in a view direction equal to the angle, $\theta 5$, to receive a beam of light from the photonics chip 28. The optical phased array 36 of the photonics chip 28 is located at an angle, $\theta 6$, relative to optical phased array 14a of the photonics chip 10a. The optical phased array 14a of the photonics chip 10a may be tuned to communicate with the optical phased array 36 of the photonics chip 30 by directing a steered beam of light from the optical phased array 14a at an emission angle equal to the angle, $\theta 6$, or by aiming the optical phased array 14a in a view direction equal to the angle, $\theta 6$, to receive a beam of light from the photonics chip 26. The driving circuit and optical phase shifters may be used to control and match the emission angle and view direction of the optical phased array 14a enabling communication between the different chip pairs.

The angles θ4, θ5, θ6 may be measured relative to the reference plane defined by the top surface 23 of the substrate 21. Each of the angles θ4, θ5, θ6 may include an azimuthal component and an elevational component in a spherical coordinate system. In an embodiment, the azimuthal component of each of the angles θ4, θ5, θ6 may be equal and the elevational component may be varied by tuning. In an embodiment, each of the angles θ4, θ5, θ6 may include a range of angles.

Due to differences in relative positions, the set of angles θ4, θ5, θ6 associated with the photonics chip 10a and providing communication paths with the photonics chips 26, 28, 30 will differ from the set of angles θ1, θ2, θ3 that provide communication paths between the photonics chips 26, 28, 30 and the photonics chip 10. Each of the photonics chips 26, 28, 30 may be equipped with optical phase shifters to enable communications with one or the other of the photonics chips 10, 10a. For example, the photonics chip 26 may communicate with the photonics chip 10 at an angle, θ1, in which the optical phased array 32 is tuned using the optical phase shifters to a view direction equal to angle, θ1, and the photonics chip 26 communicates with the photonics chip 10a at an angle, θ4, in which the optical phased array 32 is tuned using the optical phase shifters to a view direction equal to angle, θ4.

Figure 5:
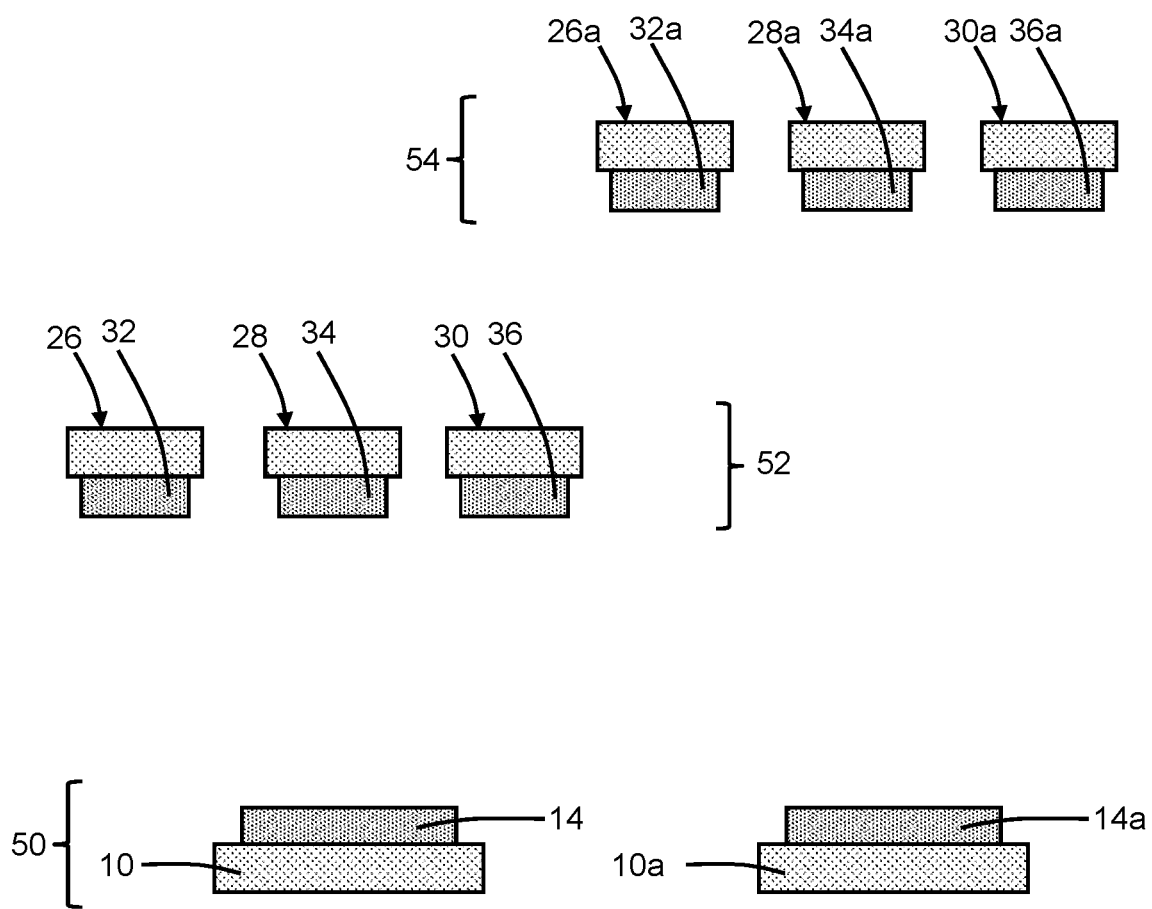

With reference to FIG. 5 and in accordance with embodiments of the invention, the photonics chips 10, 10a may be grouped in a level 50, the photonics chips 26, 28, 30 may be grouped in a different level 52, and another level 54 of photonics chips 26a, 28a, 30a may be provided. Each of the photonics chips 26a, 28a, 30a may be similar in construction to the photonics chips 26, 28, 30 and may, in particular, include phased optical arrays 32a, 34a, 36a. One or both of the photonics chips 10, 10a may be configured to communicate with the photonics chips 26, 28, 30 and/or with the photonics chips 26a, 28a, 30a. In an embodiment, the photonics chips 26a, 28a, 30a may be configured to provide a different functionality than the photonics chips 26, 28, 30. For example, the photonics chips 26a, 28a, 30a may be configured to store data and the photonics chips 26, 28, 30 may be configured to perform optical computing. In another example, photonics chips 26a, 28a, 30a and the photonics chips 26, 28, 30 may be configured separately to function as optical biosensors in order to analyze different types of samples.

Figure 6:
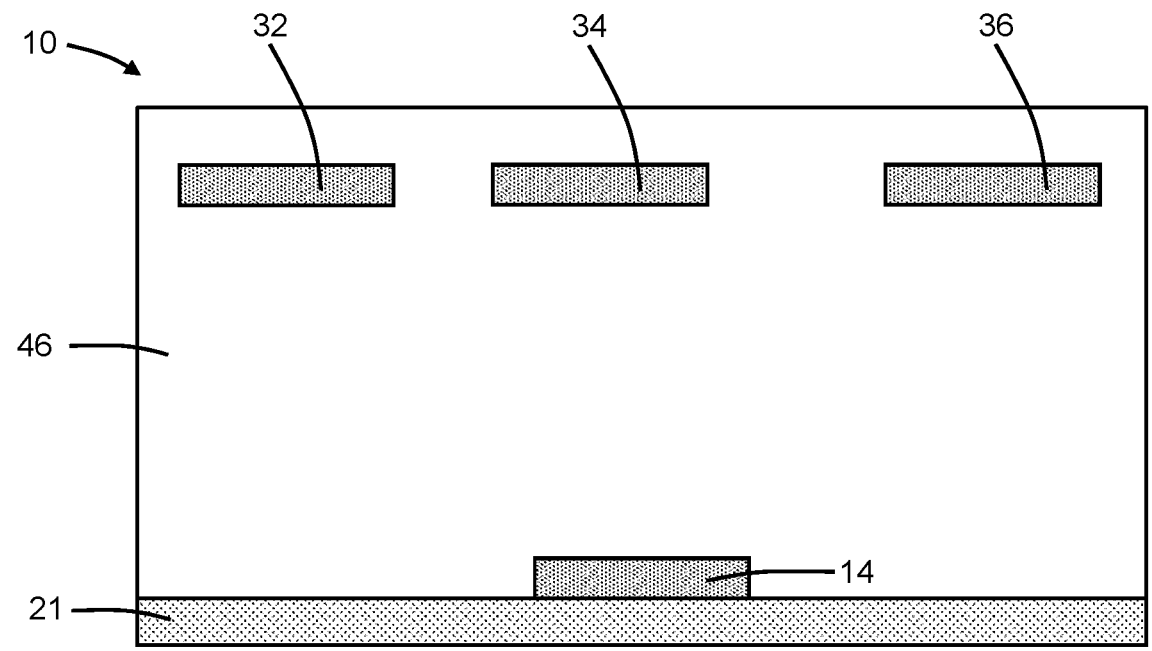

With reference to FIG. 6 in which like reference numerals refer to like features in FIG. 3 and in accordance with embodiments of the invention, the optical phased arrays 32, 34, 36, as well as their optional associated optical phase shifters, may be placed on the same photonics chip 10 as the optical phased array 14 such that all of the optical phased arrays 14, 32, 34, 36 are located on the same substrate 21. For example, the optical phased arrays 32, 34, 36 may each include antennas with grating structures that are formed by depositing a layer of a material, such as silicon nitride, and patterning the deposited layer with lithography and etching processes. In this embodiment, the antennas of the optical phased array 14 may be composed of single-crystal silicon, and the antennas of all of the optical phased arrays 32, 34, 36 may be composed of silicon nitride. As another example, the optical phased arrays 32, 34, 36 may each include antennas with grating structures that are formed in a manner similar to the grating structures 20 of each optical antenna 12 and then transferred by a wafer bonding technique to the photonics chip 10. In this embodiment, the antennas of all of the optical phased arrays 14, 32, 34, 36 may be composed of single-crystal silicon. The space between the optical phased arrays 32, 34, 36 and the optical phased array 14 may be filled by one or more dielectric layers 46, such as dielectric layers composed of a dielectric material such as silicon dioxide. In one aspect, the intra-chip system may differ from the inter-chip system in that the space between optical phased arrays is filled by the solid dielectric material of the one or more dielectric layers 46 instead of free space.

Figure 7:
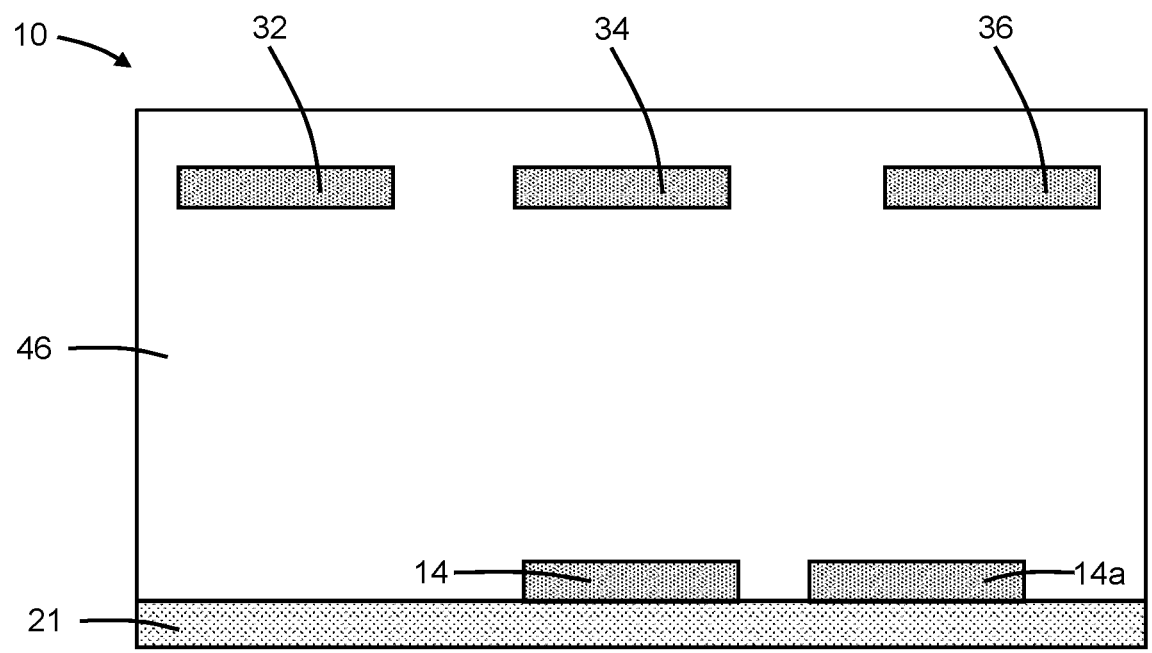

With reference to FIG. 7 in which like reference numerals refer to like features in FIG. 3 and in accordance with embodiments of the invention, the optical phased array 14a may be included on the substrate 21 of the photonics chip 10 and positioned relative to the optical phased arrays 38, 40, 42. The optical phased array 14a may be associated with another central control unit, in addition to the central control unit associated with optical phased array 14, configured to communicate under the control of a shared driving circuit 15 with the other optical phased arrays 38, 40, 42 on the same photonics chip 10 in an intra-chip system.

Figure 8:
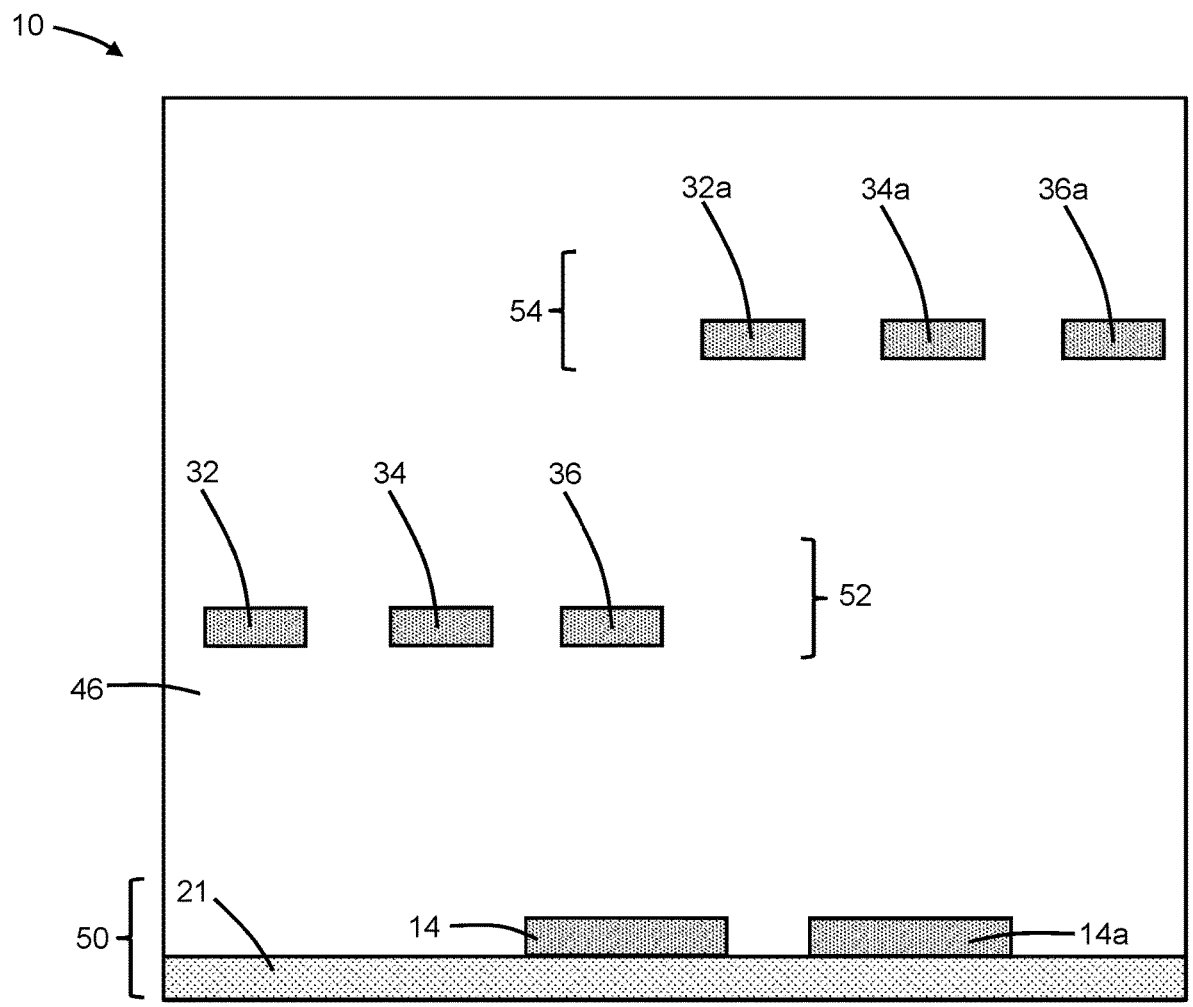

With reference to FIG. 8 and in accordance with embodiments of the invention, the photonics chips 10, 10a may be grouped in the level 50, the photonics chips 26, 28, 30 may be grouped in the level 52, and the photonics chips 26a, 28a, 30a may be grouped in the level 54 on the substrate 21 of the photonics chip 10. The optical phased array 14a may be associated with another central control unit, in addition to the optical phased array 14, configured to communicate under the control of the driving circuit 15 with the optical phased arrays 38, 40, 42 and the optical phased arrays 38a, 40a, 42a on the same photonics chip 10 in an intra-chip system.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first optical phased array including a first plurality of antennas;
   a first plurality of phase shifters respectively coupled to the first plurality of antennas;
   a second optical phased array including a second plurality of antennas, the second optical phased array located in a first direction relative to the first optical phased array; and
   a third optical phased array including a third plurality of antennas, the third optical phased array located in a second direction relative to the first optical phased array, and the second direction different from the first direction,
   wherein the first plurality of phase shifters are configured to steer a beam of light from the first optical phased array in the first direction toward the second optical phased array, and the first plurality of phase shifters are configured to steer the beam of light from the first optical phased array in the second direction toward the third optical phased array.

2. The structure of claim 1 wherein each of the first plurality of antennas has a first emission angle that is fixed, and the first plurality of phase shifters are configured to tune the first plurality of antennas to provide a variable emission angle to steer the beam of light in either the first direction or the second direction.

3. The structure of claim 1 further comprising:
   a photonics chip including a substrate, the first optical phased array, the second optical phased array, and the third optical phased array.

4. The structure of claim 3 further comprising:
   one or more dielectric layers positioned between the first optical phased array and the second optical phased array and between the first optical phased array and the third optical phased array.

5. The structure of claim 3 wherein the first optical phased array includes a first plurality of optical antennas composed of single-crystal silicon, the second optical phased array includes a second plurality of optical antennas composed of silicon nitride, and the third optical phased array includes a third plurality of optical antennas composed of silicon nitride.

6. The structure of claim 3 wherein the first optical phased array includes a first plurality of optical antennas composed of single-crystal silicon, the second optical phased array includes a second plurality of optical antennas composed of single-crystal silicon, and the third optical phased array includes a third plurality of optical antennas composed of single-crystal silicon.

7. The structure of claim 1 further comprising:
   a fourth optical phased array including a fourth plurality of antennas,
   wherein the second optical phased array is located in a third direction relative to the fourth optical phased array, and the third optical phased array is located in a fourth direction relative to the fourth optical phased array.

8. The structure of claim 7 wherein the fourth optical phased array is configured to steer a beam of light from the fourth optical phased array in the third direction toward the second optical phased array, and the fourth optical phased array is configured to steer the beam of light from the fourth optical phased array in the fourth direction toward the third optical phased array.

9. The structure of claim 8 wherein the first optical phased array is configured to steer the beam of light from the first optical phased array in the first direction toward the second optical phased array, the first optical phased array is configured to steer the beam of light from the first optical phased array in the second direction toward the third optical phased array, the third direction is not equal to the first direction or the second direction, and the fourth direction is not equal to the first direction or the second direction.

10. The structure of claim 7 further comprising:
    a photonics chip including a substrate, the first optical phased array, the second optical phased array, the third optical phased array, and the fourth optical phased array.

11. The structure of claim 7 further comprising:
    a first photonics chip including a first substrate and the first optical phased array;
    a second photonics chip including a second substrate and the second optical phased array;
    a third photonics chip including a third substrate and the third optical phased array; and
    a fourth photonics chip including a fourth substrate and the fourth optical phased array.

12. The structure of claim 1 wherein the first optical phased array is located in a first level, the second optical phased array is located in a second level, the third optical phased array is located in a third level, the second level has a first functionality, and the third level has a second functionality that is different than the first functionality of the second level.

13. The structure of claim 1 wherein the first optical phased array lacks moving mechanical parts.

14. The structure of claim 1 further comprising:
    a first photonics chip including a first substrate and the first optical phased array;
    a second photonics chip including a second substrate and the second optical phased array; and
    a third photonics chip including a third substrate and the third optical phased array,
    wherein the first photonics chip is separated from the second photonics chip and the third photonics chip by free space.

15. The structure of claim 1 further comprising:
    a second plurality of phase shifters respectively coupled to the second plurality of antennas; and
    a third plurality of phase shifters respectively coupled to the third plurality of antennas.

16. A structure comprising:
a first photonics chip including a first substrate, a first optical phased array that includes a first plurality of antennas, and a plurality of phase shifters respectively coupled to the first plurality of antennas;
a second photonics chip including a second substrate and a second optical phased array that includes a second plurality of antennas, the second optical phased array located in a first direction relative to the first optical phased array; and
a third photonics chip including a third substrate and a third optical phased array that includes a third plurality of antennas, the third optical phased array located in a second direction relative to the first optical phased array, and the second direction different from the first direction,
wherein the first photonics chip is separated from the second photonics chip and the third photonics chip by free space.

17. A method comprising:
forming a first optical phased array including a first plurality of antennas;
forming a first plurality of phase shifters coupled to the first plurality of antennas;
forming a second optical phased array including a second plurality of antennas; and
forming a third optical phased array including a third plurality of antennas,
wherein the second optical phased array is located in a first direction relative to the first optical phased array, the third optical phased array is located in a second direction relative to the first optical phased array, the second direction is different from the first direction, the first plurality of phase shifters are configured to steer a beam of light from the first optical phased array in the first direction toward the second optical phased array, and the first plurality of phase shifters are configured to steer the beam of light from the first optical phased array in the second direction toward the third optical phased array.

18. The method of claim 17 wherein the first optical phased array is located on a first photonics chip, the first photonics chip includes a first substrate, the second optical phased array is located on a second photonics chip, the second photonics chip includes a second substrate, the third optical phased array is located on a third photonics chip, and the third photonics chip includes a third substrate.

19. The method of claim 18 wherein the first photonics chip is separated from the second photonics chip and the third photonics chip by free space.

20. The method of claim 17 wherein the first optical phased array, the second optical phased array, and the third optical phased array are located on a photonics chip, and the photonics chip includes a substrate.

\* \* \* \* \*